United States Patent
Nishida

(10) Patent No.: US 9,829,144 B2
(45) Date of Patent: Nov. 28, 2017

(54) PIPE-REINFORCING IMPLEMENT

(71) Applicant: THE CHUGOKU ELECTRIC POWER CO., INC., Hiroshima (JP)

(72) Inventor: Hidetaka Nishida, Hiroshima (JP)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 77 days.

(21) Appl. No.: 14/764,860

(22) PCT Filed: Feb. 1, 2013

(86) PCT No.: PCT/JP2013/052395
§ 371 (c)(1),
(2) Date: Oct. 9, 2015

(87) PCT Pub. No.: WO2014/118974
PCT Pub. Date: Aug. 7, 2014

(65) Prior Publication Data
US 2016/0040821 A1    Feb. 11, 2016

(51) Int. Cl.
*F16L 57/00* (2006.01)
*F16L 55/17* (2006.01)
*F16L 57/02* (2006.01)

(52) U.S. Cl.
CPC .......... *F16L 55/1705* (2013.01); *F16L 57/00* (2013.01); *F16L 57/02* (2013.01)

(58) Field of Classification Search
USPC .................................. 138/110, 99, 159, 171
See application file for complete search history.

(56) References Cited

U.S. PATENT DOCUMENTS 31,614 A  *  3/1861  Mayall ................. F16L 11/085
                                                    138/126
1,416,460 A  *  5/1922  Griffin ...................... B22C 9/22
                                                    138/159

(Continued)

FOREIGN PATENT DOCUMENTS

CN          2182918 Y      11/1994
DE          3036398 A1     4/1981

(Continued)

OTHER PUBLICATIONS

Office Action in corresponding Chinese Patent Application No. 201380071871.6 dated Mar. 2, 2016, with translation (10 pages).

(Continued)

*Primary Examiner* — James Hook
(74) *Attorney, Agent, or Firm* — Osha Liang LLP

(57) ABSTRACT

A pipe-reinforcing implement with excellent workability during attachment to the piping is provided. The reinforcing implement 1 is to be arranged along an outer circumferential face Xb of a metal piping X, in a state surrounding the piping in a circumferential direction, in which creep may occur due to a high temperature and pressure fluid inside, and configured to reinforce creep strength of the piping, the reinforcing implement including a plurality of reinforcing members 11 arranged in the circumferential direction to be joined and a plurality of laminate members 12, 13, 14 overlaid in a radial direction of the piping to configure each of the reinforcing members.

16 Claims, 3 Drawing Sheets

(56) References Cited

U.S. PATENT DOCUMENTS

| | | | | | |
|---|---|---|---|---|---|
| 2,267,817 | A | * | 12/1941 | Costa | F16L 41/028 |
| | | | | | 156/191 |
| 2,716,788 | A | * | 9/1955 | Naramore | B60R 13/06 |
| | | | | | 428/192 |
| 2,946,395 | A | * | 7/1960 | Overland | F01N 13/18 |
| | | | | | 138/99 |
| 3,044,498 | A | * | 7/1962 | Barnes | F16L 9/006 |
| | | | | | 138/115 |
| 3,453,008 | A | * | 7/1969 | Lejeune | F16L 33/28 |
| | | | | | 138/109 |
| 3,996,968 | A | * | 12/1976 | Bergman | A01G 25/06 |
| | | | | | 138/103 |
| 4,433,732 | A | * | 2/1984 | Licht | A62C 3/16 |
| | | | | | 138/167 |
| 4,478,661 | A | * | 10/1984 | Lewis | B29C 53/48 |
| | | | | | 138/119 |
| 4,523,738 | A | * | 6/1985 | Raftis | F16L 33/28 |
| | | | | | 138/109 |
| 4,874,649 | A | * | 10/1989 | Daubenbuchel | B29C 49/22 |
| | | | | | 138/137 |
| 5,288,108 | A | * | 2/1994 | Eskew | F16L 55/172 |
| | | | | | 138/99 |
| 5,755,710 | A | * | 5/1998 | Menard | A61F 13/15585 |
| | | | | | 604/378 |
| 7,946,311 | B2 | * | 5/2011 | Kolzumi | F16L 11/088 |
| | | | | | 138/123 |
| 8,113,242 | B1 | * | 2/2012 | Bennett | B29C 63/0069 |
| | | | | | 138/97 |
| 8,631,829 | B1 | * | 1/2014 | Bennett | B29C 66/8284 |
| | | | | | 138/104 |
| 2006/0118191 | A1 | * | 6/2006 | Rice | F16L 55/1686 |
| | | | | | 138/99 |
| 2010/0212768 | A1 | * | 8/2010 | Resendes | F16L 59/153 |
| | | | | | 138/116 |
| 2012/0325357 | A1 | * | 12/2012 | Vu | F16L 23/024 |
| | | | | | 138/97 |

FOREIGN PATENT DOCUMENTS

| | | | |
|---|---|---|---|
| JP | 2003-014163 | A | 1/2003 |
| JP | 2006-249885 | A | 9/2006 |
| JP | 2007-071360 | A | 3/2007 |
| JP | 2011-185403 | A | 9/2011 |

OTHER PUBLICATIONS

Extended European Search Report issued in corresponding European Application No. 13873881.0 dated Sep. 2, 2016 (7 pages).

Notification of Transmittal of Translation of the International Preliminary Report of Patentability for corresponding International Application No. # PCT/JP2013/052395, dated Aug. 13, 2015 (1 page).

International Preliminary Report on Patentability for corresponding International Application No. # PCT/JP2013/052395, dated Aug. 4, 2015 (1 pages).

English Translation of Written Opinion issued in corresponding PCT Application No. PCT/JP2013/052395 dated Mar. 5, 2013 (5 pages).

English translation of Japanese Office Action issued in counterpart Japanese Application No. 2013-557305 dated Apr. 2, 2014 (3 pages).

International Search Report issued in corresponding PCT Application No. PCT/JP2013/052395 dated Mar. 5, 2013 (4 pages).

Written Opinion issued in corresponding PCT Application No. PCT/JP2013/052395 dated Mar. 5, 2013 (5 pages).

Japanese Office Action issued in counterpart Japanese Application No. 2013-557305 dated Apr. 2, 2014 (2 pages).

Office Action in corresponding Chinese Patent Application No. 201380071871.6 dated Oct. 26, 2016, with translation (10 pages).

Office Action in corresponding Korean Patent Application No. 10-2015-7021628 dated Dec. 29, 2016, with an English translation (16 pages).

Office Action in counterpart Chinese Patent Application No. 201380071871.6 dated May 17, 2017 (20 pages).

Office Action in corresponding Korean Patent Application No. 10-2015-7021628 dated Jul. 26, 2017, with translation (8 pages).

* cited by examiner

PIPE-REINFORCING IMPLEMENT

TECHNICAL FIELD

The present invention relates to a pipe-reinforcing implement which increases the creep strength of a metal pipe where creep takes place due to a high temperature and pressure fluid therein.

BACKGROUND ART

As a metal pipe to which creep takes place due to the high temperature and pressure fluid therein, there is known a steam piping through which a high temperature of, for example, 300° C. to 650° C. (572° F. to 1202° F.) and a high pressure of, for example, approximately 5 Mpa to 8 Mpa steam for power flows where this steam for power is used as power for, for example, steam turbines and the like. Such a steam piping having high temperature and pressure steam used for power flowing therethrough would be subject to degradation due to creep.

The reinforcement of this steam piping is performed in order to prevent rupture of the steam piping associated with creep degradation. And the reinforcing method commonly adopted has the part of the steam piping as the target cut to have joined a robust piping to this cut part of the steam piping. However, this method has issues of the work being troublesome since the work is accompanied by fusion cutting, welding work and heat treatment operation on the steam piping. Being the case, there is known a method of reinforcing the steam piping by, for example, winding a wire around the target part of the steam piping (see for example, PTL 1).

CITATION LIST

Patent Literature

[PTL 1]
Japanese Patent Application Laid-open Publication No. 2011-185403

SUMMARY OF INVENTION

Technical Problem

When a wire is wound around the target part of the steam piping to be reinforced without cutting the steam piping in the method of reinforcing the steam piping by winding wire as mentioned above, the metal fixings and the like which are used to fix the beams of the building or the steam piping may interfere when winding the wire. Particularly, there may be a case where it is difficult to secure enough space around the steam piping when winding of the wire is performed by a machine.

Therefore, for example, there may be a reinforcing method where two metal reinforcing members are made to come along the outer circumference of the steam piping to sandwich and come into contact with the steam piping, and then the two reinforcing members further surround the steam piping to be joined with bolts and the like. However, this method has an issue that the weight would increase since a certain thickness is required to the reinforcing member for providing strength so to withstand the steam pressure in the steam piping. And this leads to poor workability due to difficulty in manipulating and the like of the reinforcing member.

The present invention has been made in view of such background and an object thereof is to provide a pipe-reinforcing implement with excellent workability during attachment to the piping.

Solution to Problem

A main aspect of the present invention for solving the aforementioned problem is a reinforcing implement to be arranged along an outer circumferential face of a metal piping, in a state surrounding the piping in a circumferential direction, in which creep may occur due to a high temperature and pressure fluid inside, and configured to reinforce creep strength of the piping, the reinforcing implement including
a plurality of reinforcing members arranged in the circumferential direction to be joined and
a plurality of laminate members overlaid in a radial direction of the piping to configure each of the reinforcing members.

According to the reinforcing implement of the present invention, the plurality of reinforcing members which are joined to surround the piping in the circumferential direction, have a plurality of laminate members overlaid in the radial direction of the piping. And each laminate member can be handled as a separate body when the reinforcing members are not joined to each other. Therefore, when the piping is reinforced, all you need to do is to overlay a laminate member which is more lightweight than an integrally formed reinforcing member and then join the reinforcing members having the laminate members layered, so that the attachment work such as the manipulation can be performed easily. Thus the piping can be reinforced in a manner similar to the case when an integrally formed reinforcing member is used, by overlaying the plurality of the laminate members. In other words, a pipe-reinforcing implement with excellent workability during attachment to the piping can be provided.

In the aforementioned reinforcing implement, it is preferable that the laminate member includes a curved part that is curved along the circumferential direction of the piping and a flange part that protrudes out in the radial direction from an edge in the circumferential direction of the curved part and
the flange parts, of the plurality of the laminate members included in the reinforcing members that are adjacent to each other, are fixed by a fixing member to join the plurality of the reinforcing members.

According to such a reinforcing implement, the reinforcing member which has layered the plurality of laminate members each including a curved part and flange parts, are placed to surround a piping so that the piping can be reinforced just by fixing with a fixing member the overlaid flange parts of the adjacent reinforcing members. At this time, the curved part of each laminate member is curved along the circumferential direction of the piping and overlaid in the radial direction of the piping so that high creep strength can be provided by overlaying the lightweight laminate members.

In the aforementioned reinforcing implement, it is preferable that the flange part is provided with a through hole that penetrates the flange in a thickness direction and
the fixing member includes a bolt configured to have a shaft part inserted through the through hole and a nut configured to be screwed on the bolt.

According to such a reinforcing implement, the fixing of the adjacent flanges can be performed by screwing a nut to a bolt so that the structure can be simplified and the piping can be reinforced with a simple operation as well.

In the aforementioned reinforcing implement, it is preferable that the reinforcing members when having the reinforcing members adjacent to each other joined to surround the piping, has the flange parts of the joined reinforcing members spaced apart from each other. According this structure, the curved part can be made to certainly come into contact with the piping by the flange parts being pulled toward each other to be proximately-fixed using a fixing member so that an expanding of the piping can be restrained.

In the aforementioned reinforcing implement, it is preferable that a thickness of the flange part is greater than a thickness of the curved part. According to this structure, the flange parts can be more tightly clamped with the fixing member.

In the aforementioned reinforcing implement, it is preferable that the piping includes a welded part where a plurality of piping members are butt and welded and at the welded part, the laminate members are arranged such that a number of layers of the laminate members increases toward a direction away from the welded part. According to this structure, the laminate members are positioned such that the number of layers of the laminate members increases toward a direction away from the welded part so that the stress concentration at the welded part can be reduced when a force acts in the direction of the expansion of the piping.

In the aforementioned reinforcing implement, it is preferable that the reinforcing members are formed with a metal having creep strength higher than creep strength of a metal configuring the piping. According to this structure, the reinforcing strength can be increased.

Advantageous Effects of Invention

According to the present invention, a pipe-reinforcing implement with excellent workability during attachment to the piping can be provided.

DESCRIPTION OF EMBODIMENTS

Figure 1:
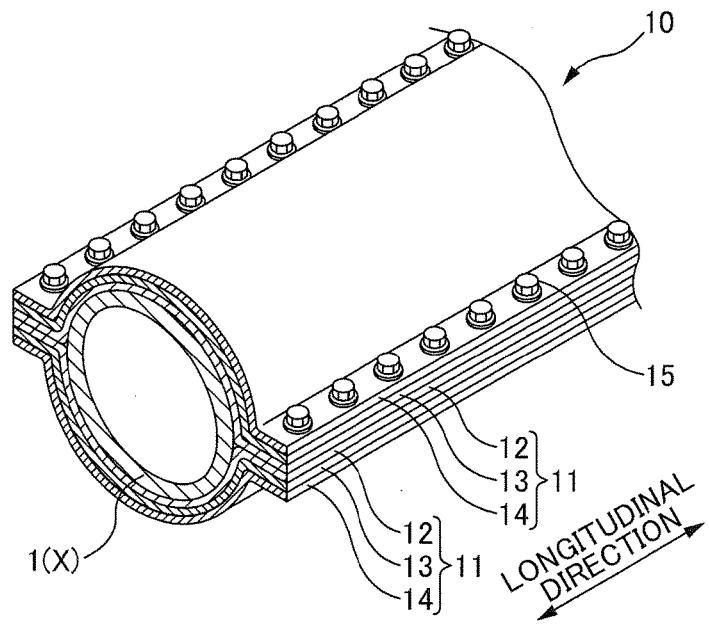
FIG. 1 is a diagram illustrating a structure of a steam piping reinforced with a reinforcing implement.
Figure 2:
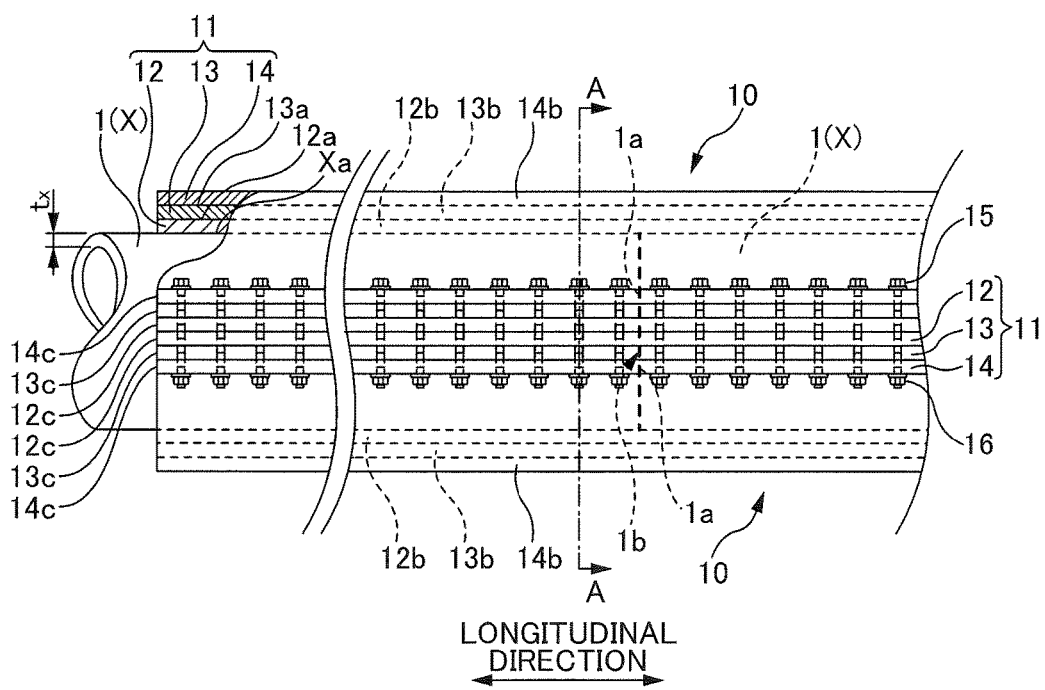
FIG. 2 is a side view showing the reinforcing implement attached to a straight piping section of the steam piping.

Description of a steam piping will be given in the following as an example of a metal piping according to an embodiment of the present invention. FIG. 1 is a diagram illustrating a structure of a steam piping X reinforced with a reinforcing implement 10. FIG. 2 is a side view showing the reinforcing implement attached to a straight piping section of the steam piping.

As illustrated in FIGS. 1 and 2, the cylindrical steam piping X has steam for power (steam temperature of 300° C. to 650° C. (572° F. to 1202° F.) and steam pressure of 5 Mpa to 8 Mpa) flowing through the inner space thereof over a long period of time so that creep would occur due to this steam for power. The steam piping X is formed of ferritic chrome steel (e.g. 9Cr to 12Cr) having low coefficient of thermal expansion (i.e. high creep strength) to bear the high temperature and pressure steam flowing therethrough.

Although the diameter of the steam piping X varies according to its use, it is defined in the range of, for example, 200 mm or greater to 1000 mm or less. Additionally, the wall thickness tx of the steam piping X is defined in the range of 40 mm or greater to 70 mm or less. Here, the diameter and the wall thickness of the steam piping X is defined taking into consideration the various conditions of such as the temperature, the pressure, the flow volume and the flow rate of the steam for power.

Figure 4:
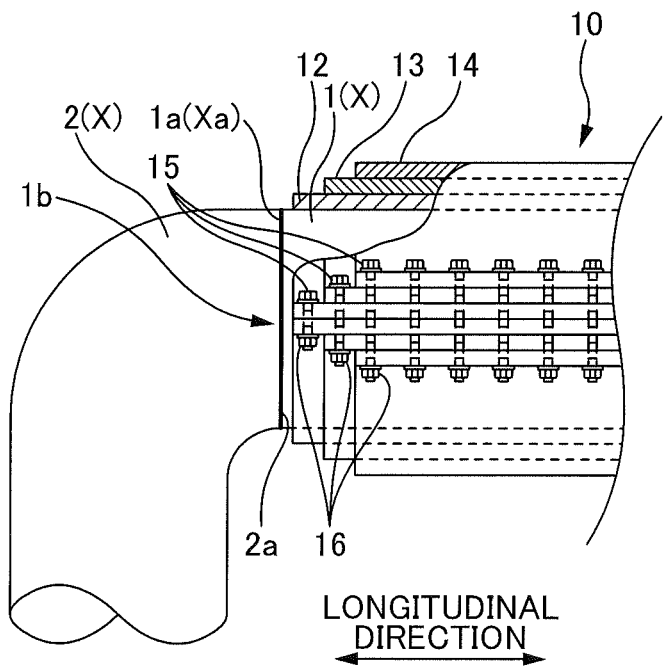
FIG. 4 is a side view showing a reinforcing implement attached proximate to a circumferentially welded part of the steam piping.

The part as the target of reinforcement in the present embodiment is the substantially linear straight piping section of the steam piping X. The length of such a straight piping section may extend up to a few hundred meters by a plurality of piping members 1, formed in predetermined lengths, having their end parts 1a in the longitudinal direction butt against each other to be welded, as illustrated in FIG. 2. And the longitudinal end part Xa of the straight piping section in the connected steam piping X has butt and welded thereto an end part 2a of a piping member 2 with a bended portion (so-called elbow part) which is formed in substantially 90 degrees, that is, bended in an L shape, as illustrated in FIG. 4. Therefore, the circumferentially welded parts 1b which are welded in the circumferential direction along the entire circumference of the piping are included in a plurality of parts along the longitudinal direction of the steam piping X.

Figure 3:
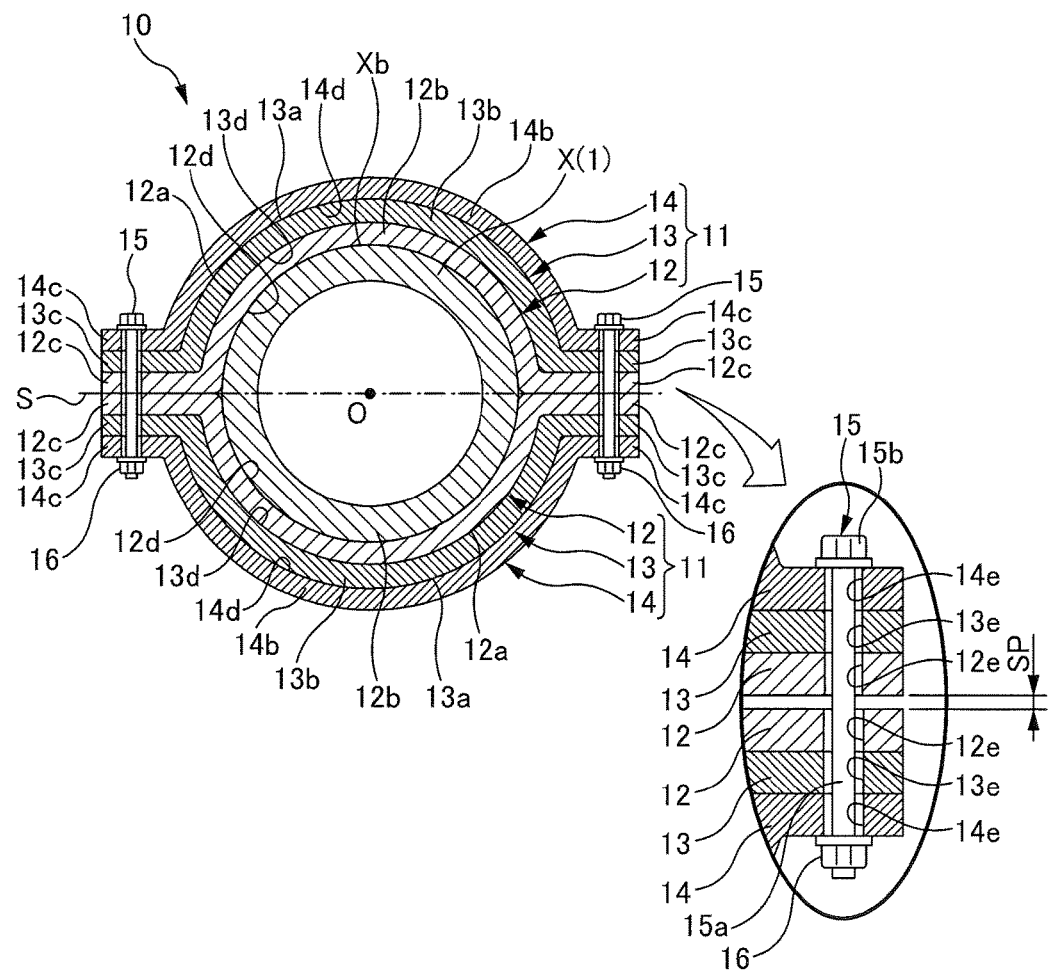
FIG. 3 is a cross-sectional view taken along line A-A in FIG. 2.

The straight piping section of the steam piping X has attached thereto a reinforcing implement 10 for reinforcement to increase the creep strength of the steam piping X. The reinforcing implement 10 includes a plurality of reinforcing members 11 which have predetermined lengths along the longitudinal direction of the steam piping X and are arranged along the circumferential direction of the steam piping X, bolts 15 as fixing members which join the circumferentially adjacent reinforcing members and nuts 16 which are screwed to the bolts 15. In the present embodiment, the outer circumferential face Xb of the steam piping X is sectioned into two areas by a virtual plane S which runs in the diameter direction through the center O of the steam piping X, as illustrated in FIG. 3. And the two reinforcing members 11 formed to substantially cover each of the sectioned areas are arranged to come into contact with the outer circumferential face Xb of the steam piping X in a manner sandwiching the steam piping X from two sides in the radial direction of the steam piping X to thereby surround the steam piping X.

Each reinforcing member 11 is structured with a plurality (three in the present embodiment) of laminate members 12, 13, 14 each of which are overlaid in the radial direction of the steam piping X. Each laminate member 12, 13, 14 is formed of a material whose creep strength is higher than that of the material (ferritic chrome steel) of the steam piping X. For example, stainless steel, nickel alloy, cobalt alloy, high-chrome steel is used. And in this way, the use of a material, with creep strength higher than that of the material of the steam piping X, as the material of each laminate member 12, 13, 14 allows the reinforcing strength for the steam piping X to be increased. Additionally, the bolts 15 and nuts 16 for fixing the adjacent reinforcing members 11 together are formed of a material with creep strength which is higher than that of the material of the steam piping X, similar to the reinforcing member 11, and they are made of the same material (e.g. SUS304) as that of the reinforcing members 11 in the present embodiment.

Each of the laminate members 12, 13, 14 are formed in curved plate shapes each including a respective curved part 12b, 13b, 14b and flange parts 12c, 13c, 14c. The curved parts 12b, 13b, 14b are curved so to be overlaid along the steam piping X positioned on the side close to the center O of the steam piping X with respect to each of the laminate members 12, 13, 14 or along the outer circumferential faces Xb, 12a, 13a of the laminate members 12, 13, and the flange parts 12c, 13c, 14c protrude in the radial direction from the circumferential edges of the curved parts 12b, 13b, 14b. The respective curved parts 12b, 13b, 14b of the laminate members 12, 13, 14 form the sections that surround the outer circumferential face Xb of the steam piping X and the flange parts 12c, 13c, 14c form the sections used for fixing the adjacent reinforcing members 11, to be specific, the laminate members 12, 13, 14 adjacent to each other in the circumferential direction and overlaid on each other.

In the following description, among the laminate members 12 that are overlaid on each other in the radial direction to configure the reinforcing member 11, the laminate member which is arranged on the innermost circumferential side, in other words, the laminate member which is arranged on the side close to the steam piping X is referred to as the inner laminate member 12, the laminate member which is arranged on the outermost circumferential side is referred to as the outer laminate member 14, and the laminate member which is arranged between the inner laminate member 12 and the outer laminate member 14 is referred to as the middle laminate member 13.

The inner laminate member 12 which is arranged to cover the outer circumferential face Xb of the steam piping X at the innermost circumferential side has the inner circumferential face 12d of the curved part 12b formed with substantially the same radius of curvature as that of the outer circumferential face Xb of the steam piping X, and the arc length of the curved part 12b is formed slightly shorter than the arc length of the steam piping X. The middle laminate member 13 has the inner circumferential face 13d of the curved part 13b formed with substantially the same radius of curvature as that of the outer circumferential face 12a of the inner laminate member 12. The outer laminate member 14 has the inner circumferential face 14d of the curved part 14b formed with substantially the same radius of curvature as that of the outer circumferential face 13a of the middle laminate member 13. In other words, the radius of curvature on the inner face of the curved part 13b of the middle laminate member 13 is formed longer than the radius of curvature on the inner circumferential face 12d of the curved part 12b of the inner laminate member 12 by a dimension equal to the thickness 12t of the inner laminate member 12, and the radius of curvature on the inner circumferential face 14d of the curved part 14b of the outer laminate member 14 is formed longer than the radius of curvature on the inner circumferential face 13d of the curved part 13b of the middle laminate member 13 by a dimension equal to the thickness 13t of the middle laminate member 13.

The flange parts 12c, 13c, 14c which protrude in the radial direction from the circumferential edges of the curved part 12b of the inner laminate member 12, the curved part 13b of the middle laminate member 13 and the curved part 14b of the outer laminate member 14, protrude outside from the edges of the curved parts 12b, 13b, 14b in directions opposite each other. And when the inner laminate member 12, the middle laminate member 13 and the outer laminate member 14 are overlaid each other, the flange part 12c of the inner laminate member 12, the flange part 13c of the middle laminate member 13 and the flange part 14c of the outer laminate member 14 are configured to also have the flange parts 12c, 13c, 14c overlaid each other.

The flange parts 12c, 13c, 14c respectively have through holes 12e, 13e, 14e through which the shaft parts 15a of the bolts 15 for fixing together the adjacent reinforcing members 11 are inserted in the direction of the thickness of the flange parts 12c, 13c, 14c. And a plurality of the through holes 12e, 13e, 14e are provided with appropriate spaces therebetween along the longitudinal direction of the steam piping X, in other words, the longitudinal direction of the inner laminate member 12, the middle laminate member 13 and the outer laminate member 14. The diameter of the through holes 12e, 13e, 14e are formed larger than the diameter of the shaft parts 15a of the bolts 15 that are inserted therethrough but smaller than the head parts 15b of the bolts 15 as well as the nut 16. Therefore, when the nuts 16 are screwed on the bolts 15 which are inserted through the through holes 12e, 13e, 14e of the pair of flange parts 12c, 13c, 14c of the overlaid adjacent reinforcing members 11, the heads 15b of the bolts 15 and the nuts 16 sandwich the adjacent flange parts 12c, 13c, 14c for the nuts 16 to be tightened on the bolts 15 so to thereby firmly fix the flange parts 12c, 13c, 14c together.

The amount of reinforcing members 11 included in the reinforcing implement 10 in the present embodiment was set to two so that the two reinforcing members 11 become reinforcing members 11 that are adjacent to each other. And when the two reinforcing members 11 surround the steam piping X in a manner sandwiching the steam piping X, the flange parts 12c of the respective inner laminate members 12 oppose each other with a distance therebetween so that a space sp is created between the flange parts 12c of the two inner laminate members 12. In other words, the total circumferential length of the curved parts 12b of the inner laminate members 12 included in the two reinforcing members 11 is determined to be the length that creates this space sp. This space sp is formed to restrain the expanding of the steam piping X using the reinforcing members 11. Specifically, the curved parts 12b, 13b, 14b can be pulled in the circumferential direction by a length of the space sp by making the flange parts 12c, 13c, 14c come close to each other and then having them proximately-fixed with the bolts 15 and the nuts 16. Hereby, the steam piping X is tightened by the curved parts 12b, 13b, 14b allowing the steam piping X to confront the expanding thereof.

Next, description of the reinforcing work performed on the steam piping X using the aforementioned reinforcing implement 10 will be given.

Firstly, one reinforcing member 11 of the two reinforcing members 11 is arranged on a half of the steam piping X followed by arranging the other reinforcing member 11 on the other half of the steam piping X. At this time, each of the reinforcing members 11 being a member which is large and lengthy in the longitudinal direction accompanied by a massive load, is arranged to surround the steam piping X by placing a laminate member 12 on each of the first half and the other half of the steam piping X together with the inner laminate member 12, the middle laminate member 13 and the outer laminate member 14 being overlaid on each other. Then the flange parts 12c, 13c, 14c of the two reinforcing members 11 which are arranged adjacent to each other are clamped and fixed with the bolts 15 and the nuts 16. Hereby, the reinforcing implement 10 is attached to the steam piping X.

When the steam piping X expands while in a state reinforced with the longitudinal positions along the plurality of laminate members 12, 13, 14 structuring the reinforcing member 11 being overlaid and inhibited relative displacement, the bending stress concentrates at the boundary between the portion surrounded by the reinforcing members 11 and the portion that is not surrounded by the reinforcing members 11. As described above, since the steam piping X includes a circumferentially welded part 1b where the end parts 1a of a plurality of piping members 1 are butt and welded to be coupled, it is preferable that the bending stress is avoided from concentrating at locations proximate the circumferentially welded part 1b.

For such reason, the circumferentially welded part 1b in the straight piping section of the steam piping X has the reinforcing implement 10 arranged such that the boundary between the section surrounded by the reinforcing members 11 and the section which is not surrounded by reinforcing members 11 (hereinafter called the boundary section) is not positioned close to the circumferentially welded part 1b. However, the number of laminate members 12, 13, 14 which are overlaid at the end part sides of the reinforcing members 11 is reduced when the boundary section is forced to be positioned proximate the circumferentially welded part 1b such as the section where the end part 2a of the piping member 2 forming the bended portion is butt and welded.

Specifically, as illustrated in FIG. 4, the through holes 12e provided at the very end of the inner laminate members 12 (see FIG. 3) at the end part sides of the reinforcing members 11, have inserted therethrough a bolt 15 that fixes only the inner laminate members 12 of the reinforcing members 11 which are adjacent to each other. The middle laminate members 13 are laid over the inner laminate members 12 such that the through holes 12e which are provided second from the end of the inner laminate members 12 and the through holes 13e provided at the very end of the middle laminate members 13 (see FIG. 3) overlap, and then the bolt 15 which fixes the inner laminate members 12 and the middle laminate members 13 of the two reinforcing members 11 together is inserted through the overlapping through holes 12e, 13e. The outer laminate members 14, the middle laminate members 13 and the inner laminate members 12 are laid over each other such that the through holes 12e which are provided third from the end of the inner laminate members 12, the through holes 13e which are provided second from the end of the middle laminate members 13 and the through holes 14e which are provided at the very end of the outer laminate members 14 (see FIG. 3) overlap one another, and then the bolt 15 for fixing the outer laminate members 14, middle laminate members 13 and the inner laminate members 12 of the two reinforcing members 11 is inserted through the overlapping through holes 12e, 13e, 14e. Hereby, the bending stress is avoided from concentrating at a position proximate the circumferentially welded part 1b of the steam piping X by increasing in a stepwise manner the number of the laminate members 12, 13, 14 which are layered, toward the end part of the reinforcing members 11.

Figure 5:
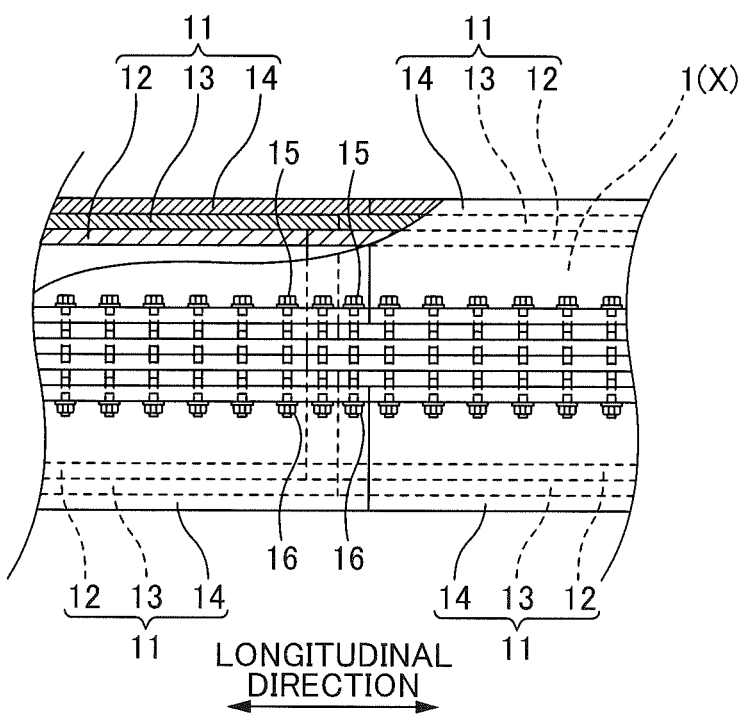
FIG. 5 is a side view showing a section on the opposite side of the circumferentially welded part of the reinforcing implement attached proximate to the circumferentially welded part of the steam piping.

In the reinforcing members 11 at this time, the end part on the opposite side of the circumferentially welded part 1b has, the outer laminate members 14 protrude outward in the longitudinal direction with respect to the middle laminate members 13 and the inner laminate members 12, and the middle laminate members 13 protrude outward in the longitudinal direction with respect to the inner laminate members 12. However, as illustrated in FIG. 5, the end part of a different reinforcing implement 10 provided to be linked in the longitudinal direction is arranged and connected in a manner similar to that performed at the location proximate the circumferentially welded part 1b so to thereby allow the straight piping section of the steam piping X to be reinforced with the reinforcing members 11 which are provided with a similar thickness.

As can be understood from the above description, in the reinforcing implement 10 of the present embodiment, since the plurality of reinforcing members 11 joined in the circumferential direction while surrounding the steam piping X have each of the plurality of the laminate members 12, 13, 14 overlaid in the radial direction of the steam piping X, each of the laminate members 12, 13, 14 can be dealt as a separate body when the reinforcing members 11 are not joined together. Therefore, when reinforcing the steam piping X, the laminate members 12, 13, 14 which are more lightweight than an integrally formed reinforcing member are overlaid and then the reinforcing members 11 having the overlaid laminate members 12, 13, 14 are just joined together so that the attachment work such as the manipulation can be performed easily. And although the laminate members 12, 13, 14 are each lightweight, the steam piping X can be reinforced in a manner similar to when using an integrally formed reinforcing member by overlaying a plurality of the laminate members 12, 13, 14. In other words, a pipe-reinforcing implement 10 with excellent workability during attachment work to the steam piping X can be provided.

Further, the steam piping X can be reinforced just by arranging the reinforcing members 11 having overlaid the plurality of laminate members 12, 13, 14 including the curved parts 12b, 13b, 14b and the flange parts 12c, 13c, 14c in a manner surrounding the steam piping X and then fixing together the overlaid flange parts 12c, 13c, 14c of the adjacent reinforcing members 11 with the bolts 15 and nuts 16. And at this time, the curved parts 12b, 13b, 14b of the laminate members 12, 13, 14 are curved so to overlap each other along the steam piping X which is positioned close to the center O side of the steam piping X or the outer circumferential faces Xb, 12a, 13a of the laminate members 12, 13. Therefore, high creep strength can be provided by overlaying the lightweight laminate members 12, 13, 14.

Furthermore, the fixing of the flange parts 12c, 13c, 14c which are adjacent to each other can be performed by screwing the nuts 16 on the bolts 15 so that the steam piping X can be reinforced with a simplified structure as well as with a simple work.

Yet further still, when the reinforcing members 11 which are adjacent to each other are joined to surround the steam piping X, the flange parts 12c of the inner laminate members of the joined reinforcing members 11 are spaced apart from each other. Therefore, the curved parts 12b, 13b, 14b can be further certainly made to come into contact with the steam piping X by pulling toward each other the flange parts 12c, 13c, 14c to be proximately-fixed with the bolts 15 and the nuts 16 so that the expanding of the steam piping X can be restrained.

Even further still, the reinforcing members 11 structured with the laminate members 12, 13, 14 being overlaid, have the laminate members 12, 13, 14 arranged such that the number of layers of the laminate members 12, 13, 14 increases toward a direction away from the welding part, at a location proximate the circumferentially welded part 1b included in the steam piping X so that the stress concentration at the circumferentially welded part 1b can be reduced.

Even further still, the reinforcing members 11, in other words, the laminate members 12, 13, 14 are formed with a metal having creep strength higher than the metal configuring the steam piping X which is the target of reinforcement and thus the bearing force of the of the reinforcing members 11 can be increased.

In the aforementioned embodiment, the number of layers of the laminate members 12, 13, 14 included in the reinforcing members 11 were set to three, however, the number is not limited to such.

In the aforementioned embodiment, description was given of each of the laminate members 12, 13, 14 taking an example where the laminate members 12, 13, 14 were formed with bended plates, in other words, with substantially uniform thicknesses, however, it is not limited to such. For example, the flange parts may be formed by molding and the like such that the thickness thereof becomes thicker than the curved part. This is done because a large load is applied to the flange parts when the flange parts are fixed with the nuts and bolts and therefore, the plate thickness of the flange parts may be made thicker than the plate thickness of the curved part so that the flange parts can sufficiently bear the tightening force applied by the nuts and bolts. For example, the plate thickness of the flange parts may be set to twice the thickness of the curved part or may be set to a ratio of two to three times the plate thickness of the curved part.

The aforementioned fixing member was structured with bolts 15 and nuts 16, however, the structure is not limited to such. For example, an object such as a vise that presses the pair of flange parts with force acting from the outside toward the inside may do.

Further, the piping is not limited to those for allowing steam for power to flow therethrough. The present invention may be applied to any steam piping X as long as it allows to flow therethrough steam of substantially the same high temperature and pressure as the steam for power and is subject to degradation due to creep.

REFERENCE SIGNS LIST 1 piping member, 1a end part of piping member, 1b circumferentially welded part, 2 bended piping member, 2a end part pf bended piping member, 10 reinforcing implement, 11 reinforcing member, 12 inner laminate member (laminate member), 12a outer circumferential face of inner laminate member, 12b curved part of inner laminate member, 12c flange part of inner laminate member, 12d inner circumferential face of inner laminate member, 12e through hole of inner laminate member, 13 middle laminate member, 13a outer circumferential face of middle laminate member, 13b curved part of middle laminate member, 13c flange part of middle laminate member, 13d inner circumferential face of middle laminate member, 13e through hole of middle laminate member, 14 outer laminate member, 14b curved part of outer laminate member, 14c flange part of outer laminate member, 14d inner circumferential face of outer laminate member, 14e through hole of outer laminate member, 15 bolt, 15a shaft part, 15b head part, 16 nut, O center of steam piping, S virtual plane, X steam piping, Xa end part of steam piping, Xb outer circumferential face of steam piping, sp space between flange parts, tx wall thickness of steam piping.

The invention claimed is:

1. A reinforcing implement to be arranged along an outer circumferential face of a metal piping, in a state surrounding the piping in a circumferential direction, in which creep may occur due to a high temperature and pressure fluid inside, and configured to reinforce creep strength of the piping, the reinforcing implement comprising:
a plurality of reinforcing members arranged in the circumferential direction to be joined and
a plurality of laminate members overlaid in a radial direction of the piping to configure each of the reinforcing members, wherein
each of the plurality of laminate members comprises:
a curved part that is curved along the circumferential direction of the piping; and
a flange part that protrudes out in the radial direction from an edge in the circumferential direction of the curved part,
the flange parts of the plurality of laminate members that are adjacent to each other are fixed by a fixing member to join the plurality of the reinforcing members, and
when the plurality of reinforcing members that are adjacent to each other are joined to surround the piping, the laminate members of each of the reinforcing members contact each other, and opposing flange parts of the laminate members of the reinforcing members that are adjacent to each other are spaced apart from each other by an empty space.

2. The reinforcing implement according to claim 1, wherein
the flange part is provided with a through hole that penetrates the flange in a thickness direction and
the fixing member includes a bolt configured to have a shaft part inserted through the through hole and a nut configured to be screwed on the bolt.

3. The reinforcing implement according to claim 2, wherein
a thickness of the flange part is greater than a thickness of the curved part.

4. The reinforcing implement according to claim 2, wherein
the piping includes a welded part where a plurality of piping members are butt and welded and
at the welded part, the laminate members are arranged such that a number of layers of the laminate members increases toward a direction away from the welded part.

5. The reinforcing implement according to claim 2, wherein the reinforcing members are formed with a metal having creep strength higher than creep strength of a metal configuring the piping.

6. The reinforcing implement according to claim 1 wherein a thickness of the flange part is greater than a thickness of the curved part.

7. The reinforcing implement according to claim 6, wherein
the piping includes a welded part where a plurality of piping members are butt and welded and
at the welded part, the laminate members are arranged such that a number of layers of the laminate members increases toward a direction away from the welded part.

8. The reinforcing implement according to claim 6, wherein the reinforcing members are formed with a metal having creep strength higher than creep strength of a metal configuring the piping.

9. The reinforcing implement according to claim 1, wherein the reinforcing members are formed with a metal having creep strength higher than creep strength of a metal configuring the piping.

10. The reinforcing implement according to claim 9, wherein
a thickness of the flange part is greater than a thickness of the curved part.

11. A reinforcing implement to be arranged along an outer circumferential face of a metal piping, in a state surrounding the piping in a circumferential direction, in which creep may occur due to a high temperature and pressure fluid inside, and configured to reinforce creep strength of the piping, the reinforcing implement comprising:

a plurality of reinforcing members arranged in the circumferential direction to be joined and a plurality of laminate members overlaid in a radial direction of the piping to configure each of the reinforcing members, wherein each of the plurality of laminate members comprises:

a curved part that is curved along the circumferential direction of the piping; and a flange part that protrudes out in the radial direction from an edge in the circumferential direction of the curved part, the flange parts of the plurality of laminate members that are adjacent to each other are fixed by a fixing member to join the plurality of the reinforcing members, when the flange parts are fixed, the flange parts of the laminate members that surround the piping are spaced apart from each other by an empty space, the piping includes a welded part where a plurality of piping members are butt and welded and at the welded part, the laminate members are arranged such that a number of layers of the laminate members increases toward a direction away from the welded part.

12. A reinforcing implement to be arranged along an outer circumferential face of a metal piping, in a state surrounding the piping in a circumferential direction, in which creep may occur due to a high temperature and pressure fluid inside, and configured to reinforce creep strength of the piping, the reinforcing implement comprising:

a plurality of reinforcing members arranged in the circumferential direction to be joined and a plurality of laminate members overlaid in a radial direction of the piping to configure each of the reinforcing members, wherein the piping includes a welded part where a plurality of piping members are butt and welded and at the welded part, the laminate members are arranged such that a number of layers of the laminate members increases toward a direction away from the welded part.

13. The reinforcing implement according to claim 12, wherein each of the plurality of the laminate member comprises:

a curved part that is curved along the circumferential direction of the piping; and a flange part that protrudes out in the radial direction from an edge in the circumferential direction of the curved part, and the flange parts of the plurality of the laminate members that are adjacent to each other are fixed by a fixing member to join the plurality of the reinforcing members.

14. The reinforcing implement according to claim 13, wherein the flange part is provided with a through hole that penetrates the flange in a thickness direction and the fixing member includes a bolt configured to have a shaft part inserted through the through hole and a nut configured to be screwed on the bolt.

15. The reinforcing implement according to claim 13, wherein when the plurality of reinforcing members that are adjacent to each other are joined to surround the piping, the laminate members of each of the reinforcing members contact each other and opposing flange parts of the laminate members of the reinforcing members that are adjacent to each other are spaced apart from each other by an empty space.

16. The reinforcing implement according to claim 12, wherein the reinforcing members are formed with a metal having creep strength higher than creep strength of a metal configuring the piping.

* * * * *